June 8, 1965  D. S. CUSI  3,187,385
COMMINUTING METHOD AND APPARATUS
Filed July 21, 1959  5 Sheets-Sheet 2
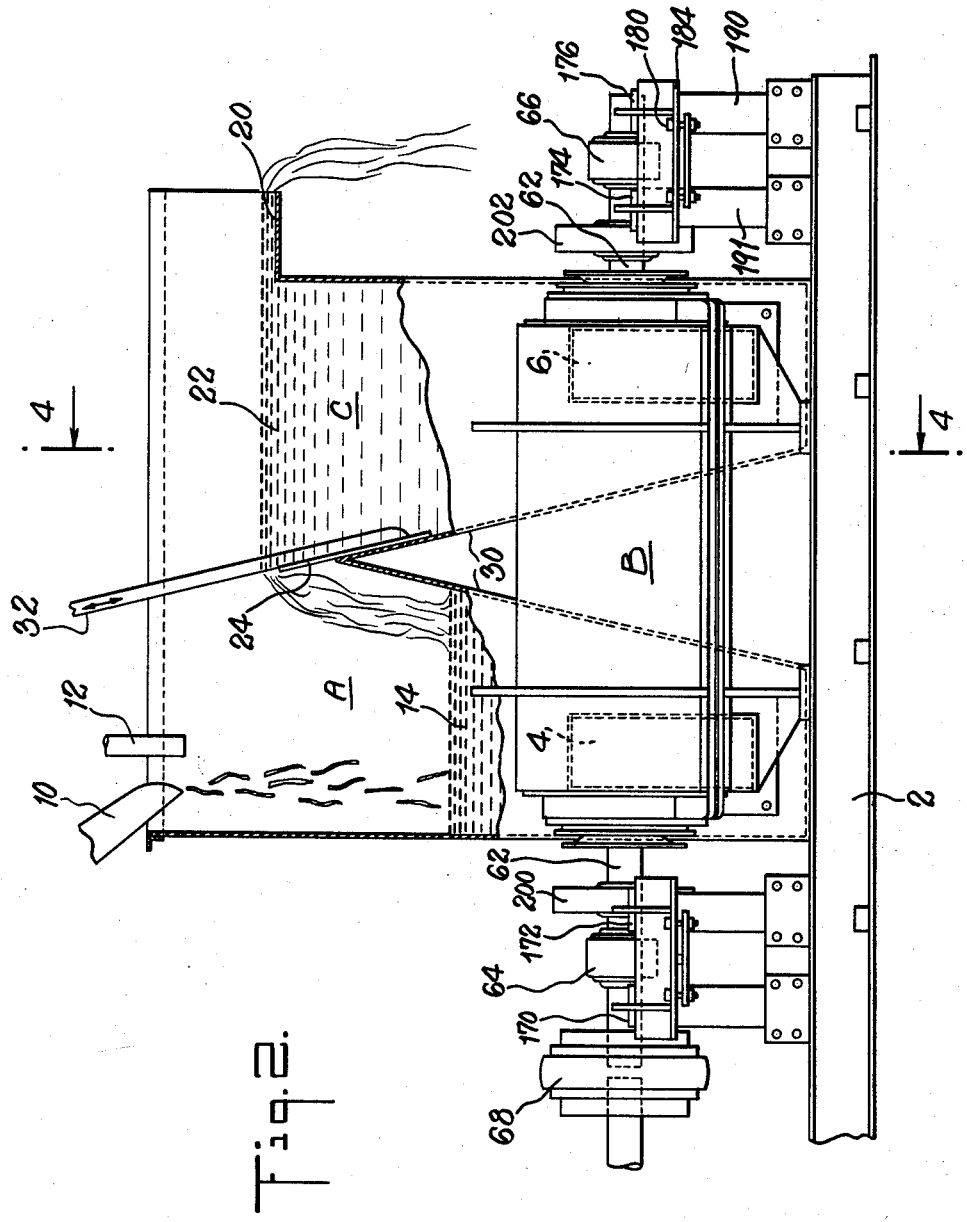
INVENTOR.
DANTE S. CUSI
BY
ATTORNEYS

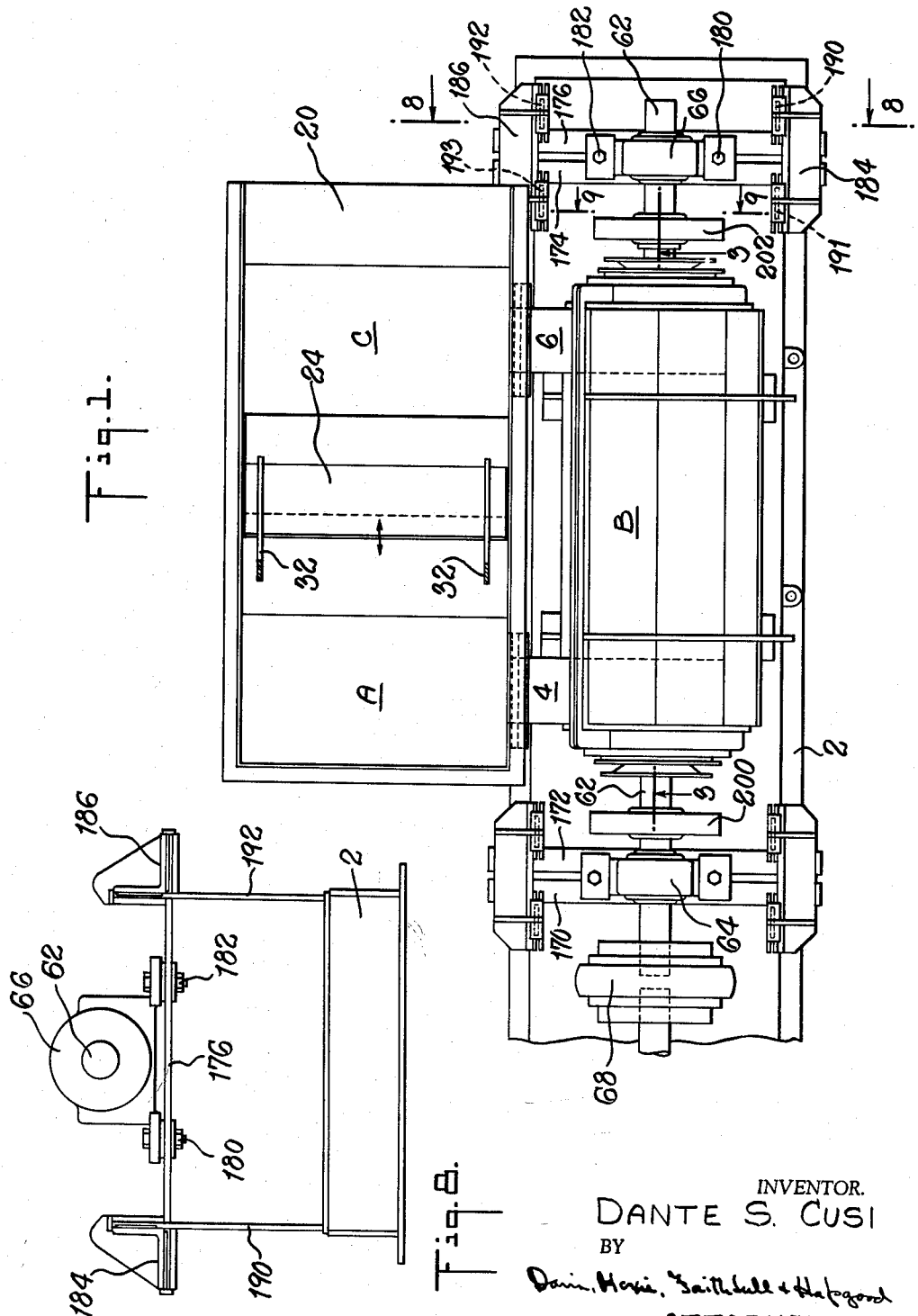

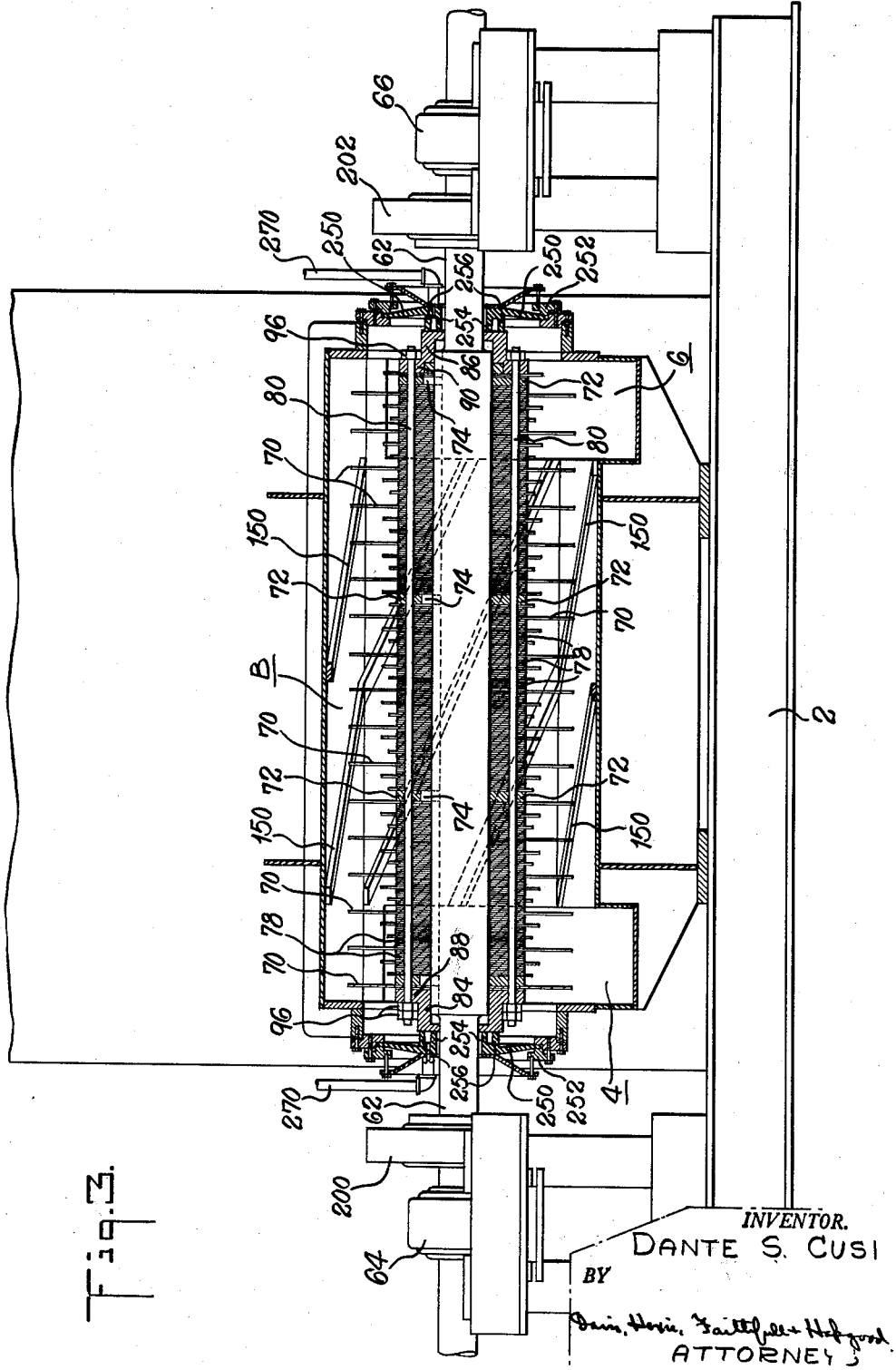

June 8, 1965
D. S. CUSI
3,187,385
COMMINUTING METHOD AND APPARATUS
Filed July 21, 1959
5 Sheets-Sheet 4
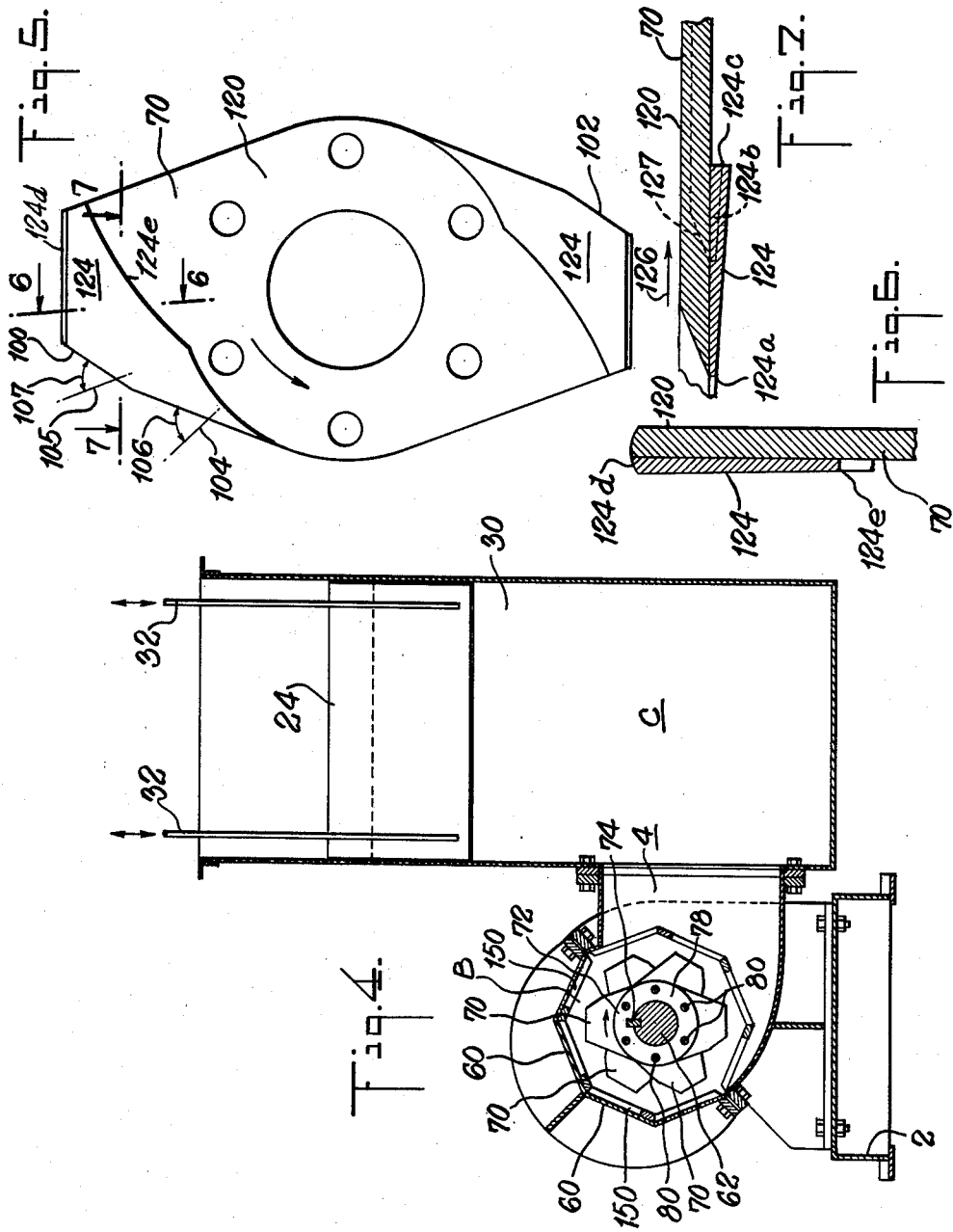
INVENTOR.
DANTE S. CUSI
BY
ATTORNEYS June 8, 1965   D. S. CUSI   3,187,385
COMMINUTING METHOD AND APPARATUS
Filed July 21, 1959   5 Sheets-Sheet 5
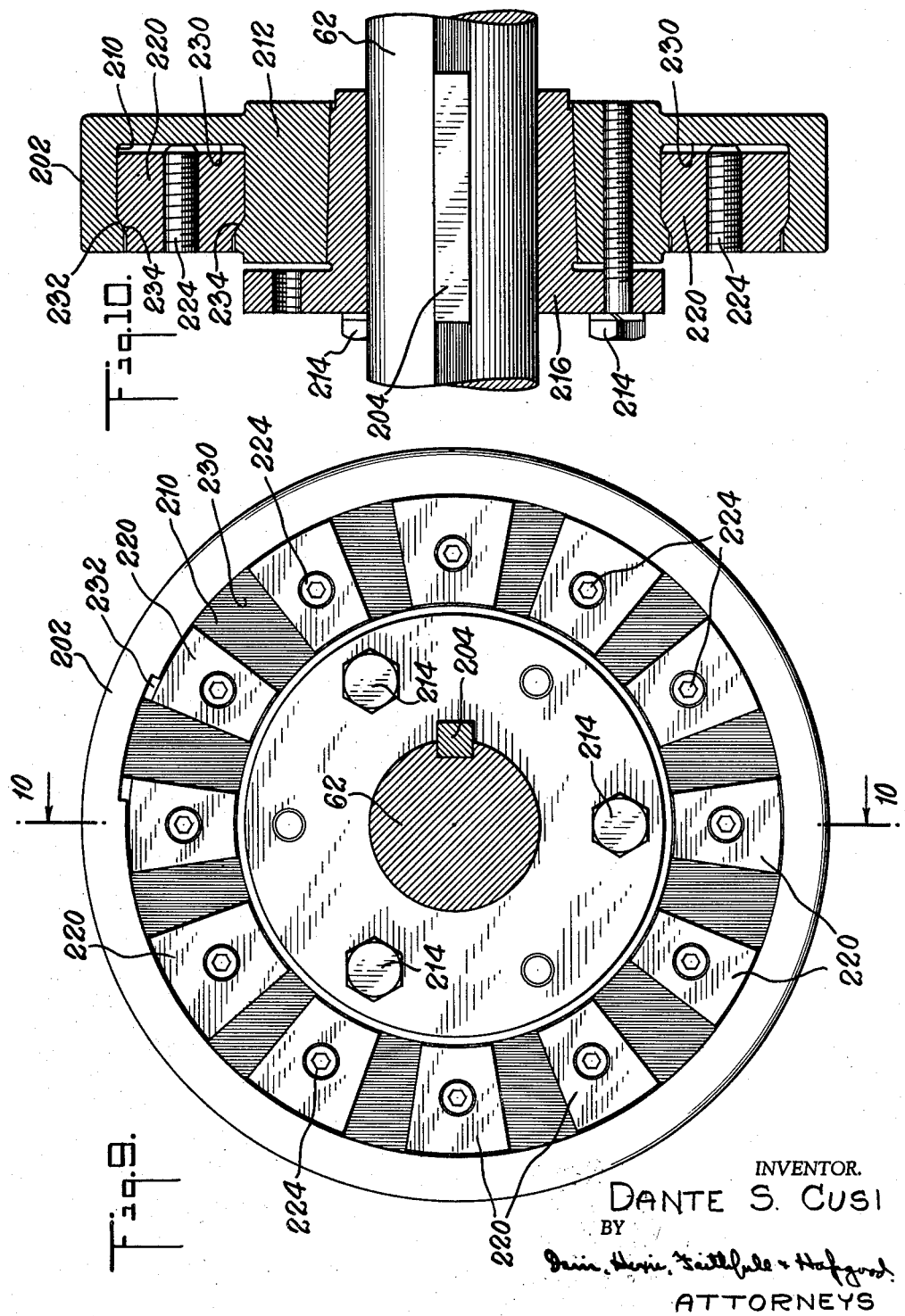
INVENTOR.
DANTE S. CUSI
BY
ATTORNEYS

3,187,385
COMMINUTING METHOD AND APPARATUS
Dante S. Cusi, Lieja 8, Mexico City 6, Mexico
Filed July 21, 1959, Ser. No. 828,534
3 Claims. (Cl. 19—8)

This application is a continuation-in-part of application Serial No. 473,585, filed December 7, 1954, and now abandoned.

This invention relates to apparatus and methods for scraping fibrous tissues, belonging to cellulosic plant material, to free them of adhering non-fibrous components.

The primary object of the invention is to detach the pith particles from the fibrous components of plant materials such, for example, as sugar-cane bagasse, corn stalks, cactus leaves and the like, and selectively to comminute the detached pith particles to produce a separable mixture of essentially unaltered fiber and comminuted pith.

In the drawings:

FIG. 1 is a plan view of apparatus constituting a preferred embodiment of my invention;

FIG. 2 is a front elevation view, partly broken away, of the apparatus of FIG. 1;

FIG. 3 is a vertical section of parts of the apparatus on the line 3—3 of FIG. 1, partly in elevation;

FIG. 4 is a vertical sectional view of the apparatus taken on the line 4—4 of FIG. 2;

FIG. 5 is an enlarged view of a rotor blade showing a construction typical of all of the blades;

FIG. 6 is a detail radial section of the blade on the line 6—6 of FIG. 5, on enlarged scale;

FIG. 7 is a detail horizontal section on the line 7—7 of FIG. 5, also enlarged;

FIG. 8 is an end elevation view showing the spring mountings for the bearing at the right end of the machine as viewed from the line 8—8 in FIG. 1;

FIG. 9 is an enlarged elevation view, partly in section on line 9—9 of FIG. 1 of the unbalance compensating wheel, and FIG. 10 is a vertical sectional view on the line 10—10 of FIG. 9.

Referring to FIGS. 1, 2 and 4 of the drawings, the apparatus in general, includes a chamber A, for receiving the raw material, a scraping and comminuting chamber B, and a receiving chamber C, assembled on suitable foundation framing 2. These chambers communicate successively with each other. Duct 4 serves as a communication between the lower portion of chamber A and the entrance end, on the left as viewed in FIGS. 1–3, inclusive, of chamber B. At the outlet end of chamber B is a duct 6 through which chamber B communicates with chamber C. The supply inlets to the apparatus comprise chute 10 for the solid vegetable material to be subjected to the scraping and comminuted action, and the source 12 of water, with which the solids form the suspension 14. The outlet from the apparatus is at 20, in chamber C, and the suspension formed in chamber A flows through chamber B and into chamber C, by way of the communicating ducts above described. The level of the suspension in chamber C is indicated at 22. Chamber A and C are separated from each other by the inverted V-shaped bulkhead 30, the effective height of which can be varied by the partition 24, slidably mounted on one of the V partition members and which may be raised and lowered by any suitable means 32, adjustment of which affords a counterflow of the suspension in chamber C back to chamber A and thence again through chamber B if it is desired to repeat the scaping and comminuting action on a certain portion of the material.

The backflow of liquid from chamber C to chamber A helps in maintaining a continuous circulation of the liquid suspension through chamber A, duct 4, chamber B, duct 6 and chamber C, even if no supply is fed from the outside into chamber A. If that occurs the machine will not plug up because there will always be a certain amount of liquid suspension going through the path above described.

Another purpose of partition 24 is to increase the treatment of the materials to be processed by returning a certain portion of the material into chamber B to be re-treated. This feature is especially useful when the materials under treatment are difficult to de-pith.

The fiber scraping and comminuting chamber B is generally tubular in shape, but for manufacturing convenience it is preferably polygonal, and in the embodiment illustrated (FIG. 4) its casing 60 is octagonal, composed of sidewall plates suitably assembled and secured together.

Within casing 60 a rotating shaft 62 is provided having certain rings, knives and other attachments to be referred to. Shaft 62 is supported by external bearings 64 and 66 and is suitably power driven by a motor, not shown, coupled with the shaft 62 by a flexible coupling 68 which may be of conventional design. The shaft rotates in a clockwise direction as viewed in FIG. 4, and it may or may not be coaxial with casing 60.

The shaft 62 is the driving part of a bladed rotor, formed of a plurality of transverse, spaced blades 70, rigidly fixed to the shaft. The assembly may be accomplished, as shown in FIG. 3, by means of a series of collars 72, each having a key 74 (FIG. 4) fitting in a keyway in shaft 62. The blades 70 are arranged along the shaft at predetermined intervals, as shown in FIG. 3 and are held at those intervals by a plurality of spacer rings 78. The assembly is rigidly secured together by a plurality of elongated bolts 80 arranged at spaced intervals around the shaft 62 (FIG. 4) and extending the entire length of the assembly (FIG. 3) through corresponding series of rod holes in the blades 70, spacer rings 78 and collars 72. The rod roles in the blades are so disposed relatively to the rod holes in the collars and the spacer rings that the blades can be assembled in balance around the shaft 62. To tighten the assembly in position, end collars 84 and 86 are provided. These collars are slidably mounted on shaft 62 and have flanges 88 and 90, respectively, apertured to receive the opposite extremities of each of the bolts 80, screw threaded to receive the nuts 96.

In FIGS. 5, 6 and 7 I have shown the details of construction of the preferred embodiment of each of the blades 70.

With the blade rotating counterclockwise, as indicated by the arrow in FIG. 5, the leading edges 100 and 102 of the blade are swept back in relation to radii to any point, of which radii, those designated 104 and 105 are typical and the sweepback is in an amount typically indicated by the angles 106 and 107 for the radii 104 and 105 respectively. The diametrically opposite cutting edge 102 is a duplicate of the edge 100 in all respects. Each of the cutting edges is disposed along a line which forms an acute angle, opposite to the direction of rotation, with the projected radius through any point on the edge. This swept back construction is effective to accomplish the fiber scraping action, especially when operating in cooperation with certain impedance elements to be described, secured to the inner surface of the casing 60. The fibre scraping action involves direct contact between the blades and the fibers rather than an action utilizing the water as a means for transmitting to the fibers an agitation produced by the blades as in many prior machines.

As shown, the leading edges may be recti-linear for ease of construction. They also may be arcuate, the arc being struck from a point behind the axis of rotation. Moreover, the leading edges may be spiral in form, or of other curvature, provided that at all points along their lengths the edges form the acute angle above referred to so that the edge is swept back with respect to the radius from the center of rotation and with respect to the sense of rotation. The feature of sweep-back of the agitator blades provides the special unique mechanical effect of the rotor, acting in cooperative relationship with the impedance elements, as will be described. By this action, generally friable or non-fibrous constituents are detached from generally non-friable or fibrous constituents, and the non-fibrous constituents are comminuted after becoming detached.

These leading edges may have various degrees of cutting ability or may be non-cutting altogether, depending upon the kind of material to be treated and of the degree of action required. Their action is to strike, cut and also to impel the fluid-suspended material centrifugally, but their fluid-throw is relatively deep. By using a thin blade having a sharp leading edge I assure metal to fiber contact in contrast to the action of a thick blade or an agitating vane which tends to displace the liquid and form what might be termed a cushion of water which prevents direct contact between the blade and the fiber.

The effect of the blades, shaped as shown in FIG. 5, on the suspension to be treated and specifically on the fibers present, is that, because of the swept-back leading edge, the striking action of the blade against the fiber is always accompanied by a sliding of the fiber along the blade edge. In fact, the fiber will virtually never be carried around by the blade in its rotating motion, but will slide along the edge of the blade from the center to the periphery of the rotating rotor assembly. If a fiber is struck exactly at the center, then it may be bent into a U as it slides along the leading edge of the blade, and in that case there may not be a slicing action along the fiber, but the leading edge of the blade may always be in contact with only one single point of the fiber as the fiber slides along the leading edge and toward the periphery of the rotating blade. But in the majority of cases, a fiber will not be struck by the rotating blades exactly in its center. In fact, the probability is always in favor of it being struck off center, and in that case the longer portion of the fiber will cause it to slide across the leading edge of the blade so that there will be a combined action: first the blade slides along the fiber; and second the fiber slides across the blade edge simultaneously. This combined action performs the fiber scraping, separating any tissue elements that do not have the orientation or the strength of the fiber element, and at the same time keeping the leading edge of the blade at the right sharpness through the continuous wear of the softer material. Without a combined sliding action the sharpness of the blades leading edges cannot be kept at the right value and the hard crystal layer may be easily broken.

To the expert in the art, it will be evident that in the operation of this machine, three main variables exist: (1) the speed of the rotating blade in relation to the liquid suspension within the casing; (2) angles 106 and 107; and (3) the sharpness of the leading edges 100 and 102 of the blades. Each variable influences the others and the operation of the machine is most effective if there is the correct selection and correlation of each working condition with the others in combination.

If the relative speed between the rotating blades and the liquid suspension is increased, the fiber scraping action will be more intense; on the other hand, if angles 106 and 107 increase, the fiber scraping action will decrease. If these angles were equal to 90°, the fiber scraping action would be zero and if these angles were decreased to zero, the fiber scraping action would increase but at the same time there would be no sliding along the blade toward the periphery of the rotor. This last condition is inefficient and the most efficient angle is an acute angle.

As the sharpness of the leading edges of the blades increases, less relative velocity is necessary for performing a deired degree of fiber scraping, but the sharpness is to be limited because if the edge is too sharp, the fibers will be cut by the rotating blades, again decreasing the scraping efficiency.

The machine is so correlated as to obtain a desired fiber scraping action that will be vigorous enough to detach and comminute the non-fibrous tissues adhering to the fibers, but not strong enough to cut or in any way break the fibers. The factors, of course, vary with different plant materials but the optimum correlation needed for any given material can be readily worked out to suit the needs of individual users once the principle of my invention is understood. Thus, to achieve a certain fiber scraping action value, the operator can increase the speed of the machine, when testing its operation, and increase to the same end the angles 106 and 107, or increase the angles and increase the blade sharpness, or increase the sharpness and decrease the speed, etc. in other words, an increase of speed requires a decrease of angles 106 and 107 or a decrease in sharpness of the leading edge of the blades, or both, etc.

Under ordinary industrial machine operating conditions, two of the aforementioned variables are not readily variable at all, but are established by the machine design, that is, the speed and the angles. The cheapest as well as the most reliable drive is a constant speed motor and desirably the blades are made with fixed angles that cannot be varied during the machine operation. Therefore, the fact that the speed and the angles cannot readily be changed without changing radically some internal parts of the machine and its drive, makes it highly desirable that the sharpness of the leading edge of the blades also be kept constant in order that a constant value of the scraping action be maintained throughout the life of the blades, despite unavoidable wear.

In general, materials to be handled with this machine, for example sugar-cane bagasse, are very abrasive, because of the presence of foreign matter such as sand, dirt, etc. This means that an ordinary knife cannot be kept sharp and after a very short time of operation it will lose its sharpness completely. This situation might be corrected by an increase in speed; however, that would not be practical. Moreover, when the sharpness of the leading edges of the blades falls below a certain value, the efficiency would start dropping. In accordance with the preferred embodiment of my invention, a self-sharpening characteristic of the blade is employed which greatly prolongs the useful life of the machine.

The main body portion of each of the blades is made from a soft steel sheet 120. On one side of each blade at and adjacent its working edges, the sheet 120 is covered, preferably, with hard crystals as "Carboloy" or a similar material, as shown at 124 (FIG. 7). These crystals, through heat treatment, are fused into the soft steel in order to obtain a good bond between the crystals and the steel and as is known in the metallurgical arts this result is obtained by using fluxes, or other metals, that fuse at a low enough temperature, or in any other way that will provide a good bond of the crystals with the metal. Of course, the hard crystals on the soft steel plate could be substituted by a combination of a hard metal sheet bonded to a soft one.

Because of the action against the blades of the material being scraped, the soft blade metal 120 will undergo more abrasion than the hard crystals 124 during the operation of the machine. Therefore, the crystal layer will stand out in front, forming the cutting edge of the blade throughout the useful life of the blades, or until the entire area 124 is eroded away. In this way the blade will be "self-sharpening" and the sharpness of the leading edge will depend upon the crystal layer thickness. The sweptback profile of the blades contributes to this self-sharpening action because the blades are subject to less direct impact and more to an abrasive action which tends to sharpen the blades as they wear.

During the operation of the machine the cutting edge and soft metal layer of the blade will recede, as suggested by arrow 126. When the soft metal layer 120 has been worn down to the position shown at 127, the hard layer that has been deposited on one side of the blade will also be worn down so that its edge is disposed as shown in dotted lines and it is reduced from its initial thickness shown at 124a to the thickness indicated by the line 124b. In order that throughout the life of the blade, the cutting edge will always have the same thickness or sharpness and, consequently, will keep the same value of the scraping action, the deposited layer is formed so that its thickness gradually increases from the thickness at 124a of the initial edge, to the thickness 124c at the inner edge of the deposit 124.

FIG. 6 is a radial section of the blade taken substantially at right angles to the plane of the section shown in FIG. 7. It will be observed that the deposited layer 124 in this view decreases in thickness in a straight line from the upper edge 124d to the lower edge 124e of the deposited layer. The relative linear speed between the blade and the solids suspension increases in direct proportion to the distance of a given point on the deposited layer from the center of rotation of the blade. By depositing the layer 124 with a thickness which decreases from the periphery toward the blade axis, I compensate for the decrease in abrasive friction due to the decrease in linear speed as the axis is approached. Furthermore, the decrease in thickness toward the shaft enhances the sharpness which is desirable because the speed of the blade, linearly, is lower as the shaft is approached.

It is to be understood, of course, that the sectional views of the blades shown are considerably enlarged. For example, in FIG. 7 the soft metal portion 120 is of the order of from 1/16 inch to 1/4 inch and preferably about 1/8 inch thick for adequate strength and the hard layer 124 may taper from about .025 inch at the cutting edge to .033 inch at the inner edge for material like bagasse.

I have found that a blade constructed as above described is of constant sharpness despite wear of the blade in use due to friction with the solids suspension in which it rotates.

In order to enhance the operation of the blades in their function of scraping and cleaning adherent pith from the fibers, I have found that the machine desirably should incorporate static impedance ridgelike projections suitably secured on the inner surface of the stator casing 60. These are shown at 150 in FIG. 3.

The outer periphery of the rotor is spaced sufficiently from these surrounding impedance elements so that a narrow, generally annular space is provided therebetween. Inasmuch as the casing as shown in the drawings is prismatic and polygonal (octagonal) in cross section, these ridges take the form of straight bars. They are of rectangular cross section and are removably affixed one to each planar section of the casing. The relative alignment of the bars may be parallel to the axis of the shaft, but they may be askew or inclined to the axis of the casing as shown. In the latter case the bars act not only to cooperate with the agitator blades in the fiber scraping of the charged material, but also act to impel its axial flow through the device. By adjusting the position alignment of these impedance elements and varying their heights, contour and number, the relative intensity of fiber scraping and comminuting action upon the charged material may be varied over a wide range. For example, for extreme action, the bars may be increased in number and height and set oppositely askew to their positions as shown, whereupon their action will be to choke the axial flow of material and to prolong considerably the time of feed through the comminutor. It must be noted, however, that the primary function of the impedance bars is to impede the charged material in the comminutor so that it will not flow or rotate unduly owing to the rotating action of the blade rotor.

Moreover, said impedance bars may also be used as a regulating device for establishing the best operating conditions of the machine, because by simple obvious means they can be so constructed as to be accessible for adjustment in position from the outside, and in that way they can be more or less turned or moved toward the axis so that more or less impedance is obtained or more or less pumping effect is created.

The cross sectional shape of the stator casing may be circular instead of polygonal, or other analogous tubular shaping may be employed. In the case of a hollow cylinder, the impedance elements may be helical vanes, generally coaxial with the axis of rotation of the rotor. They may also be straight and in parallel alignment with the axis of rotation.

The blades of the rotor as shown in the drawings especially FIG. 3, and as described previously, are thin and flat, their faces being generally planar. In one variation of the invention they may have a warped curvature relative to the leading edges, thus to become axial impellers as well as agitators. This variaiton affords additional positive flow through the comminutor, and enables it to discharge against a considerable hydraulic head of pressure imposed at the discharge end.

The stationary impedance bars can be provided with knives similar to the rotating blades 70. This similarity of course is only in the fact that they should have the swept-back edge and they should also have a self-sharpening characteristic as described above. Such stationary knives, in addition to the rotating knives, will increase the productivity of the machine, because the greater the number of knives, the more the fiber scraping action. However, I have found that the simpler the construction, the easier its operation and maintenance. In another variation of my invention the rotating blades may be completely eliminated and the rotor may consist only of helical or straight impeller vanes, in order to transmit the rotating motion to the material suspension that will then strike against the stationary blades affixed to the inside of the casing, the blades having the same characteristics of swept-back angles and self-sharpening, in order to obtain the fiber scraping action. For easy maintenance and for easy construction, however, the construction shown in the drawings is the most convenient, but my invention is not to be limited thereto except as the appended claims require.

In the operation of the machine as described above, the rotating blades wear down during their active life which results in the blade assembly shown in FIG. 4, becoming unbalanced. In the preferred embodiment of my invention, the apparatus incorporates mechanism which avoids damage, at the high rotational speed of the assembly, to bearings 64 and 66, that would occur if they were not allowed to follow the eccentric oscillations of the shaft.

The bearings 64 and 66, for the shaft 62, are mounted on horizontal springs, the springs 170 and 172 being shown in FIG. 1 for the bearing 64 and the springss 174 and 176 being shown for the bearing 66. These spring mountings are in all respects identical and FIG. 8 is a view illustrating the arrangement with reference to the bearing 66. Bearing 66 is secured to the springs 174 and 176 by bolts 180 and 182. The springs are suitably clamped at their opposite ends in brackets 184 and 186. Bracket 184 is also mounted on and secured to the upper ends of vertical leaf springs 190 and 191 (FIG. 2) suitably secured at their lower ends to the base frame of the machine. Bracket 186 is similarly mounted on the upper ends of vertical leaf springs 192 and 193. These spring mountings allow the geometric center of the shaft 62 to vibrate around the center of gravity of the shaft and the vibration will have a circular pattern, to which end both vertical and horizontal vibrations are permitted.

I have found that this spring mounting completely eliminates any danger of bearing failure due to a dynamically unbalanced shaft. The unbalance happens continuously because the blades that make up the bulk of the rotating mass of the machine are so devised that they will wear down and it is, of course, a practical impossibility to assure that the blades wear down in the same amount as would be necessary to preserve rotational balance. It is, however, desirable to avoid excessive unbalance even with the spring bearing mountings above described and in order to keep the vibration within proper limits as to its amplitude, my apparatus embodies a pair of balancing wheels 200 and 202 (FIG. 1) mounted on shaft 62.

In the enlarged views, FIGS. 9 and 10, of the wheel 202, typical of both wheels, is shown the shaft 62, to which the wheel 202 is keyed at 204. The wheel 202 has an annular channel 210 which, for ease of assembly, is formed in an annular member 212, bolted at 214 to the hub 216, fixed to the shaft. Slidably received within the annular groove 210 are a plurality of counterweights 220 which may differ in size and therefore in weight, each adjustably positioned in the annular groove 210 by a bolt 224, screw-threaded into the counterweight 220 and adapted to be tightened against the inner surface 230, of the annular groove, locking the counterweight in adjusted position by forcing its shoulder 232 against the complementary reduced portion 234 formed in the groove 210.

When the machine tends to vibrate excessively, the operator may readily decrease the amplitude of the vibration by simply stopping the machine and adjusting the position of the counterweights 220, which are accessible for such adjustment without dismantling the machine.

At 68 (FIG. 1), I have shown a flexible coupling between shaft 62 and the drive, to accommodate such vibration of the shaft.

My invention also affords a special shaft packing at opposite ends of the casing to assure against leakage of the rotating and vibrating shaft. The packing preferably is composed of a rubber diaphragm 250 (FIG. 3) suitably positioned in the retaining ring 252 and having two protruding annular concentric lips 254 and 256 which bear against the outer surface of collar 84 on the left-hand end of the machine (FIG. 3) and collar 86 at the right-hand end of the machine. Water is injected into the chamber formed between the spaced annular concentric lips through the inlet 270 which is effective to lubricate the surface between the rubber diaphragm and the end faces of the collars and by forcing its way out from between the diaphragm wall separating the lips from the collar faces and avoiding any loss of fibre through the packing.

The application of the novel comminutor of this invention is broad, since it lends itself to the ultimate separation of materials which heretofore could not be separated mechanically. The selective comminuting action is the machine's basic function, and in this, it is believed to be radically different from any apparatus which has heretofore been used for analogous purposes. Conventional machines for mechanically treating fibrous materials have a wide variety of action, such as defibering, beating, grinding, attrition, or stirring action, as is well known in the art. However, none are known which will achieve a selective comminution of one component of a fibrous plant material without substantially disintegrating or damaging the remaining components. This action of the machine is enhanced by the soaking of the plant material in the water in which it is suspended prior to the action of the knives, which soaking has the effect of expanding the spongy tissue with absorbed water and simultaneously enhancing the flexibility and toughness of the fibers.

It is a feature of a machine embodying my invention that the pulp is exceptionally clean. One of the drawbacks of bagasse pulp, for example, has been not only its non-uniformity but also the presence of foreign material such as sand, dirt, carbonized residues from the burning of the cane before harvesting and also of the sort which is picked up during the crushing process. My apparatus is effective to eliminate virtually entirely this foreign material and thereby it further contributes very appreciably to the effective utilization of such materials.

I claim:

1. The method of detaching, preparatory to separating, the fibers and the spongy tissue of plant materials such as sugar cane bagasse, which comprises forming a liquid suspension of the plant material, expanding the spongy tissue with absorbed water and simultaneously enhancing the flexibility and toughness of the fibers by soaking the plant material in the suspending liquid, thereafter subjecting the suspension to the action of a plurality of blades having leading edges which are swept back with relation to radii to the blade edges thereby relatively moving the suspension and said blade edges in directions to produce slicing draw cuts of the blade edges against the fibers so that the fibers move lengthwise of the blade edges as the blade edges move lengthwise of the fibers, while the fibers and blade edges are in contact with each other, to comminute and detach the spongy tissues from the fibers, while leaving the fibers in substantial uncomminuted condition.

2. The method of detaching, preparatory to separating, the fibers and the spongy tissue of plant material such as sugar cane bagasse, which comprises forming a liquid suspension of the plant material, soaking the plant material in the suspending liquid, thereafter subjecting the suspension to the action of a plurality of blades having leading edges which are swept back with relation to radii to the blade edges comprising moving the blades edgewise through the suspended plant material to strike the plant material with the edges of the blades, and moving the blade edges relative to and in contact with the fibers in a direction to draw the contacting fibers lengthwise of the blades along their edges to effect a slicing draw cut.

3. The method of detaching, preparatory to separating, the fibers and the spongy tissue of plant materials such as sugar cane bagasse, which comprises forming a liquid suspension of the plant material, soaking the plant material in the suspending liquid, thereafter subjecting the suspension to the action of a plurality of blades having leading edges which are swept back with relation to radii to the blade edges comprising moving the blades edgewise through the suspended plant material in a direction to strike the material with the blade edges, moving the blade edges relative to and in contact with the fibers in a direction to advance fibers along and in contact with the blade edges in the direction of the length of the blades and simultaneously relatively moving the fibers and blade edges in contact therewith in a direction lengthwise of the fibers to cut the spongy tissue and scrape it from the fibers.

(References on following page)

References Cited by the Examiner

UNITED STATES PATENTS

| | | | |
|---|---|---|---|
| 31,814 | 3/61 | Mallory | 19—5 |
| 812,122 | 2/06 | Fassett | 241—154 |
| 1,050,212 | 1/13 | Kurtz-Hahnle | 241—154 |
| 1,083,213 | 12/13 | Jackson | 241—194 X |
| 1,095,495 | 5/14 | Fernie et al. | 19—33 X |
| 1,961,808 | 6/34 | Welsford et al. | 241—247 |
| 2,039,807 | 5/36 | Kristoffersen | 241—261 |
| 2,090,925 | 8/37 | Wilkinson et al. | 19—90 |
| 2,237,510 | 4/41 | Tankersley | 241—195 |
| 2,417,184 | 3/47 | Wagner | 241—191 X |
| 2,714,995 | 8/55 | Jensen | 241—195 |
| 2,729,856 | 1/56 | Horton et al. | 19—7 |
| 2,729,858 | 1/56 | Horton et al. | 19—20 |
| 2,760,234 | 8/56 | Freeman | 19—8 |
| 2,824,500 | 2/58 | Cumpston | 241—154 X |
| 3,011,220 | 12/61 | Keller et al. | 19—7 |
| 3,064,315 | 11/62 | Schneider | 19—90 |

FOREIGN PATENTS

| | | |
|---|---|---|
| 149,504 | 12/52 | Australia. |
| 367,048 | 1/23 | Germany. |
| 13,373 | 6/11 | Great Britain. |
| 294,009 | 1/54 | Switzerland. |

DONALD W. PARKER, *Primary Examiner.*

ROBERT A. O'LEARY, *Examiner.*